Figure 1:
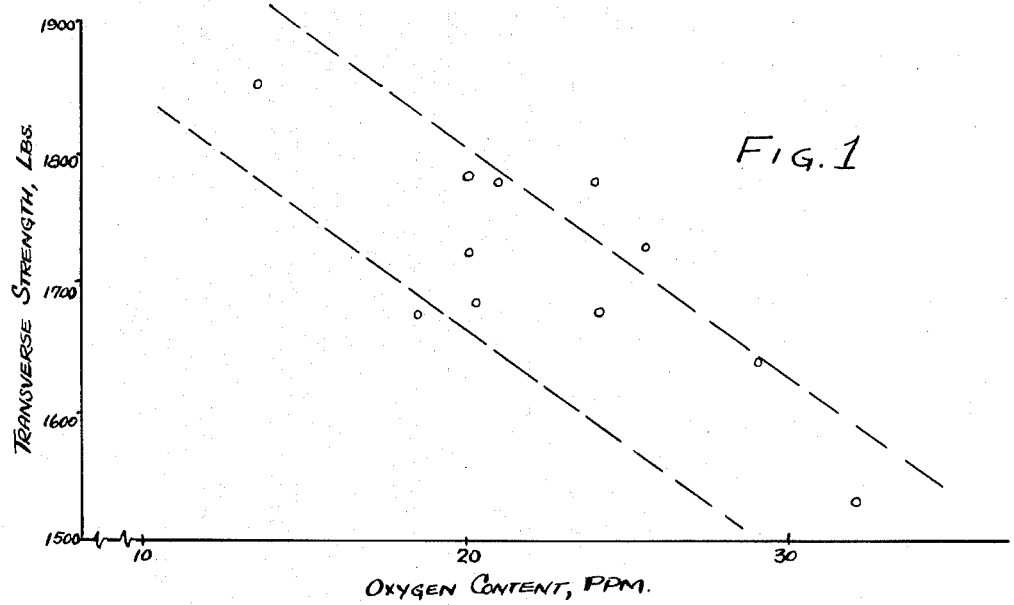

INVENTORS
WALTER A. LUCE
GLENN W. JACKSON
BY
Steward & Steward
their Attorneys

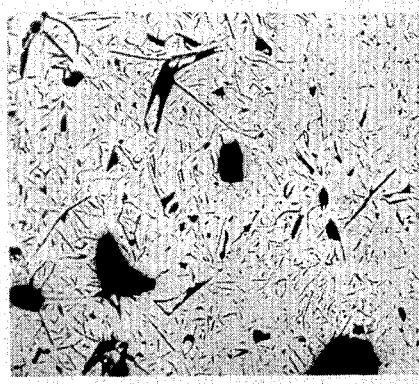

Fig. 4. Standard Duriron from Reverberatory Furnace. Type C graphite, transverse strength 920 pounds. 100X.

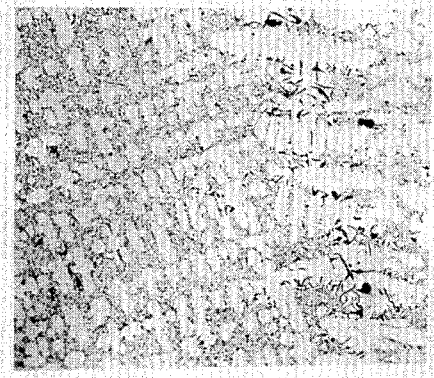

Fig. 6. Vacuum degassed Duriron showing very fine graphite (Type E) with a slight increase in porosity. Transverse strength 1626. 100X

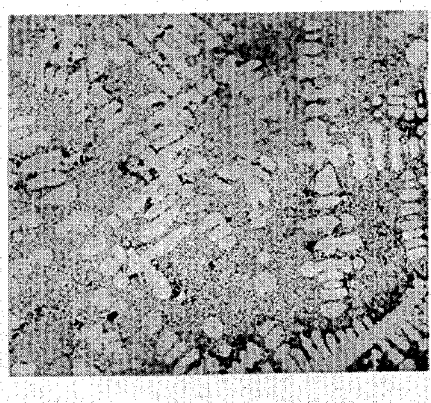

Fig. 5. Vacuum degassed Duriron showing very fine graphite (Type D) and small amount of porosity. Transverse strength 2076. 100X.

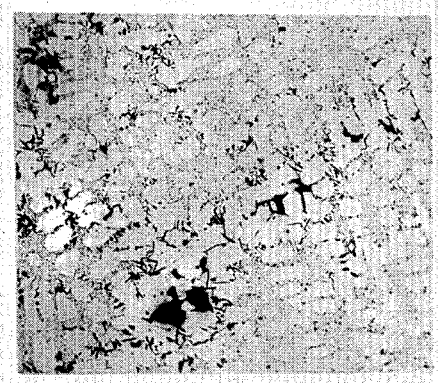

Fig. 7. Vacuum degassed Duriron showing a slight increase in size of graphite and a sufficient quantity of porosity to reduce transverse strength. (Type D & E graphite) Transverse strength 1400 p.s.i. 100X.

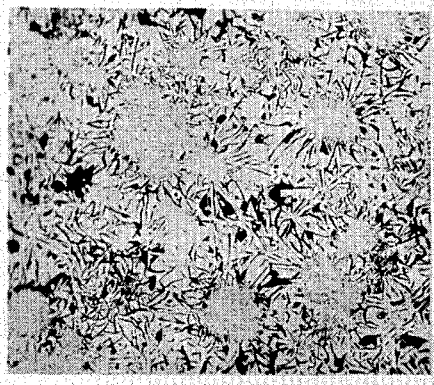

Fig. 8. Normal Duriron from a 1/4" section showing smaller graphite (Type B) and a small amount of porosity. 100X.

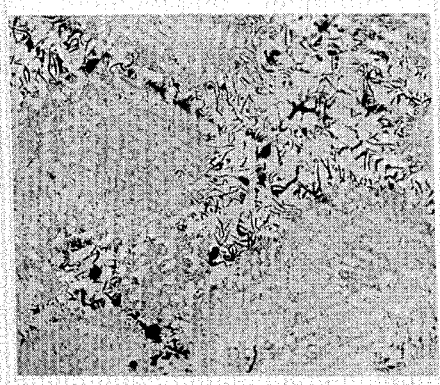

Fig. 10. Vacuum treated Duriron from a 1/4" section showing fine graphite (Type A & D) and small dendrites. 100X.

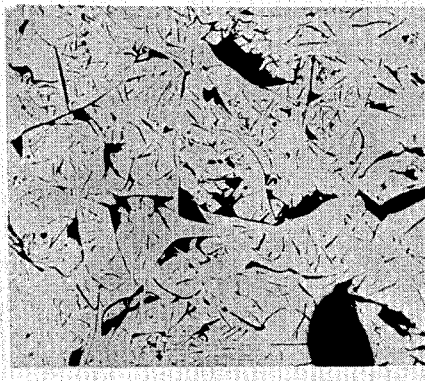

Fig. 9. Normal Duriron from a 2" section showing large graphite flakes (Type A) associated with excess porosity. 100X.

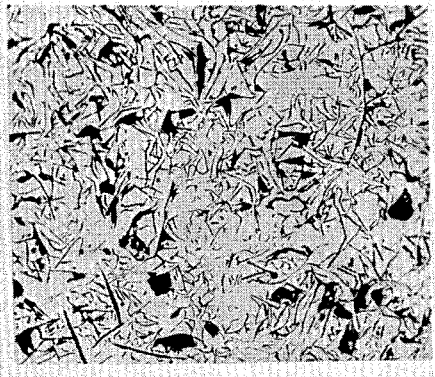

Fig. 11. Vacuum treated Duriron from a 2" section showing large graphite flakes (Type A) associated with porosity. 100X.

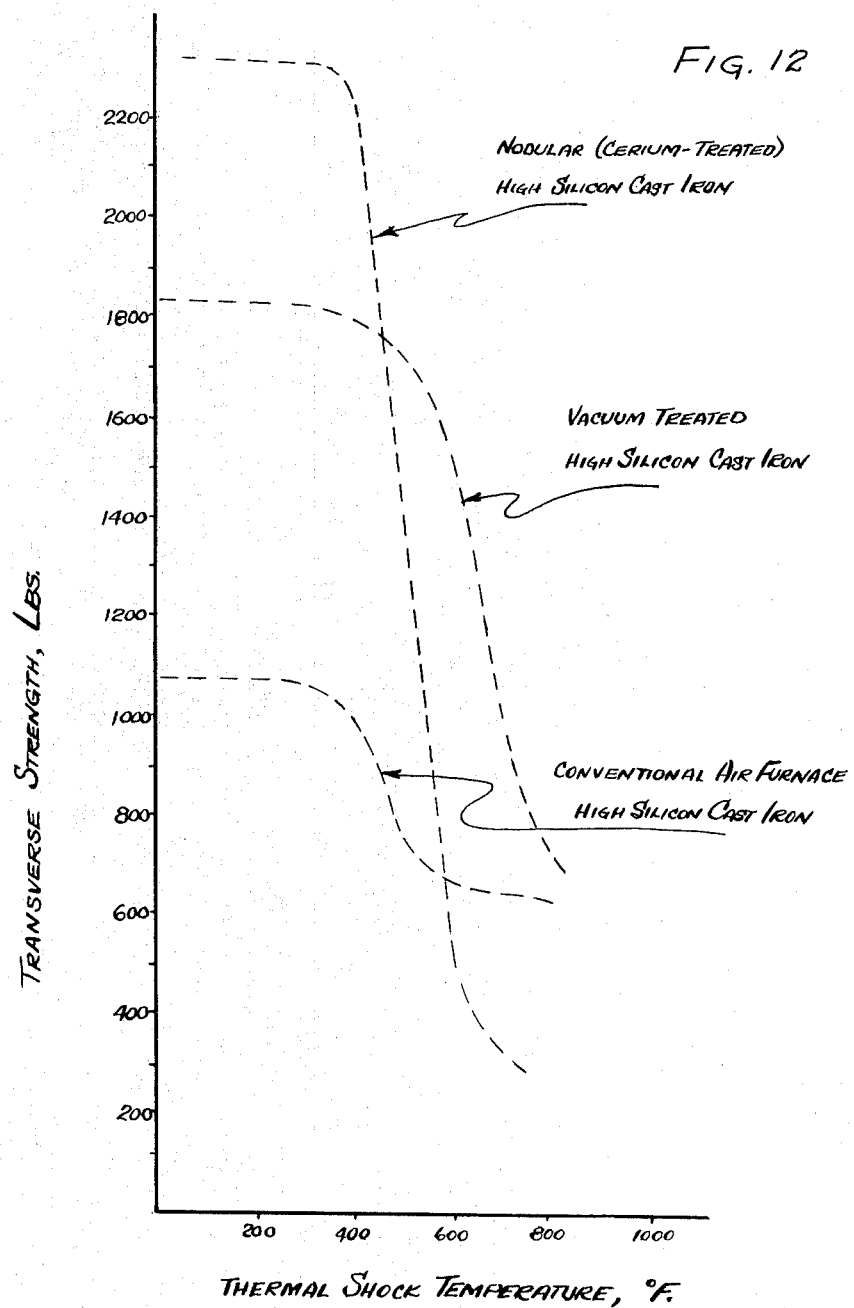

cription>
United States Patent Office 3,222,161
Patented Dec. 7, 1965

3,222,161
VACUUM TREATED HIGH SILICON CAST IRON AND PROCESS FOR MAKING SAME
Walter A. Luce and Glenn W. Jackson, Dayton, Ohio, assignors to The Duriron Company, Inc., Dayton, Ohio, a corporation of New York
Filed June 10, 1963, Ser. No. 286,676
11 Claims. (Cl. 75—49)

This invention relates to high silicon cast iron, and particularly to cast iron of this type having remarkably improved mechanical properties.

The properties of conventional high silicon cast irons are generally well-known. Briefly these are characterized by outstanding corrosion resistance, relatively low cost but poor mechanical properties when compared with other metals and alloys. By way of definition, the term high silicon cast iron as here used is consistent with its use in industry to designate cast iron having substantially more than 6% to 8% silicon, more especially at least 12% and up to 15% silicon. Numerous individual inventors, private and public companies and research organizations have been striving for years to enhance the strength of these alloys but to little avail. Large effort has been expended in the direction of siliconizing ferrous base metals, having the desired mechanical properties though lacking in corrosion resistance, to produce a siliconized coating whereby to produce a combination of strength with corrosion resistance. But this also has serious drawbacks which limits the usefulness of the technique and the process has achieved very little commercial use.

Considerable research has likewise been done along the line of treating high silicon cast iron with nodularizing inoculants, such as cerium, and while the strength of the cast iron can be altered, it has remained an unpredictable process resulting in a material of extreme brittleness and vary poor thermal shock resistance. It was also found to produce serious porosity defects, especially on the cope surface of castings, and this has greatly limited the acceptability of the process.

Vacuum furnace treatment has been applied to a wide variety of metals and alloys, especially in connection with stainless steels. These relatively expensive alloys have been vacuum treated on a commercial basis because certain mechanical properties, such as high temperature strength, are improved. This improvement results from added cleanliness of the melt but does not involve any structural change in the alloy microstructure. Therefore, the degree of improvement is rarely more than 25% of the original value and never 50%. Ordinary high silicon cast iron, having a nominal analysis of 14% to 15% silicon, about 0.9% carbon, 0.65% manganese, the balance substantially all iron, has a transverse load strength of only about 900 to 1250 pounds, with a statistical mean value of around 1075 pounds. The improvement required if it is to be of significance is more nearly of the order of at least 50% or more, and as mentioned above this is beyond anything experienced by vacuum furnace treatment of metals generally.

Again by way of definition, the transverse load strength mentioned above is a standard test for alloys such as the high silicon cast irons which, because of extreme brittleness and low ductility, render the more common tensile testing procedures impractical and inaccurate. As used throughout this disclosure and in the claims, the term signifies the load strength of the alloy material determined by using a standard cast bar 1" x 1" x 13", supported on 12 inch centers and loaded at the midpoint until fracture occurs. The results can be converted into approximate tensile strengths by multiplying the values obtained by a factor of 15.

Vacuum furnace treatment of high silicon cast iron is not reported in the prior art if it has been attempted and, as found by the present inventors, does not in any event produce consistent and practically useful results unless certain criteria are met, in accordance with the teaching disclosed herein. When such criteria are met, however, a remarkable and unexpectedly large improvement in mechanical properties is obtained.

Until the present invention, there has long existed an urgent need for high silicon cast irons of greatly improved mechanical properties, and specifically such cast irons which can be produced to provide a minimum increase of at least 50% to 100% over the mean transverse load strength of these alloys as produced heretofore in reverberatory furnaces.

It has now been found that such improved mechanical properties are achieved by vacuum degassing of the molten metal when residual hydrogen and nitrogen values in the alloys are reduced by at least 40% or more from those ordinarily obtaining in the normal air furnace produced material. Residual oxygen values also have a controlling influence on the ultimate strength, but the oxygen value is more difficult to control since it can only be removed by the reduction of an oxide with carbon, and the fact that the vacuum degassing furnace itself has an oxide lining complicates the ability to control final oxygen. The increase in strength appears to result partially from virtual elimination of defects (i.e. gas pockets or voids) caused by residual gases in the metal; but a refined graphite structure is also achived and is a necessary requisite for high strength. The absence of nitrogen, hydrogen and oxygen, except within the rather critical low limits hereinafter specified, allows the nucleation of graphite flakes or grains of substantially uniformly small size and even distribution to take place throughout the iron silicide matrix, and the resultant fine structure is inherently strong. Transverse load strength of 1600 pounds is obtained in actual practice and values of 2000 pounds or more are frequently possible.

Whereas the ferrite matrix in ordinary gray cast iron is comparatively ductile and provides the necessary cushioning effect in those alloys, in the case of the high silicon cast irons, the iron silicide matrix is exceptionally brittle and requires the presence of graphite dispersed in the matrix to impart sufficient yieldability to the alloy to prevent it from fracturing under very low mechanical loads and/or thermal shock conditions. There has been some evidence also that the presence of residual amounts of gases in the high silicon cast irons helps to relieve the extreme brittleness normally characterizing the iron silicide matrix of these alloys. Consequently the removal of residual gases to the very low levels here taught would appear to go contrary to the normal expectation so far as improvement of mechanical properties is concerned, but this has proved to be incorrect.

While the principal objective of the invention is the improvement of mechanical properties in the high silicon cast irons, there still remains the predominating requirement for corrosion resistance which, after all, is the property chiefly dictating the use of these materials. The modification of the graphite content of the normal high silicon cast irons in the manner here disclosed does not adversely affect corrosion resistance, so that the new alloys fully retain all the properties of the conventional alloys in this respect, and in some areas show substantially better corrosion resistance.

The relationship between transverse strength and residual gas content resulting from a few heats of vacuum degassed metal of nominal composition 14.5% silicon, 0.9% carbon, 0.65% manganese, balance substantially all iron, is indicated in the following table.

Table I

| Heat No. | Gas Content, p.p.m. | | | Transverse Load, Pounds | Deflection, Inches | Mechanical Shock, Inches [1] |
|---|---|---|---|---|---|---|
| | $O_2$ | $H_2$ | $N_2$ | | | |
| E-10048 | 32 | 4 | 14 | 1,104 | 0.0318 | [1] 12.3 |
| E-10049 | 32 | 3 | 7 | 1,320 | 0.0317 | [1] 16.7 |
| E-10051 | 19 | 2 | 6 | 1,445 | 0.0373 | [1] 16.5 |
| E-10052 | 9 | 3 | 8 | 1,282 | 0.0320 | [1] 13.5 |
| E-10054 | 4 | 2 | 3 | 1,706 | 0.0374 | 20.0 |
| E-10055 | 10 | 4 | 6 | 1,489 | 0.0346 | [1] 16.8 |

[1] Average of several tests.

Thus, as the gas content is reduced the strength tends to increase, but it is significant that although a 35% reduction of both $O_2$ and $H_2$ was realized for all six heats reported above, good strengths were obtained only when very low residual gas values were obtained. The conclusion accordingly is drawn that while all three residual gases normally present in these cast irons influence the strength of the material, the amount of gas removed is not as critical as the final gas value obtained.

Through the use of a vacuum fusion gas analyzer (e.g. a Serfass analyzer) it has been determined that hydrogen and introgen must be reduced to very low values in the order of 2 p.p.m. and 6 p.p.m. maximum respectively. In most cases this represents a reduction of about 40% of those gases originally present in the starting material. The importance of final oxygen values is indicated on a relative scale by the data given in Table I. Calculations indicate that the critical oxygen level is probably about 20 p.p.m. ±10 p.p.m. This is shown in the plot of transverse strength vs. oxygen content in FIG. 1 of the drawings.

Figure 2:
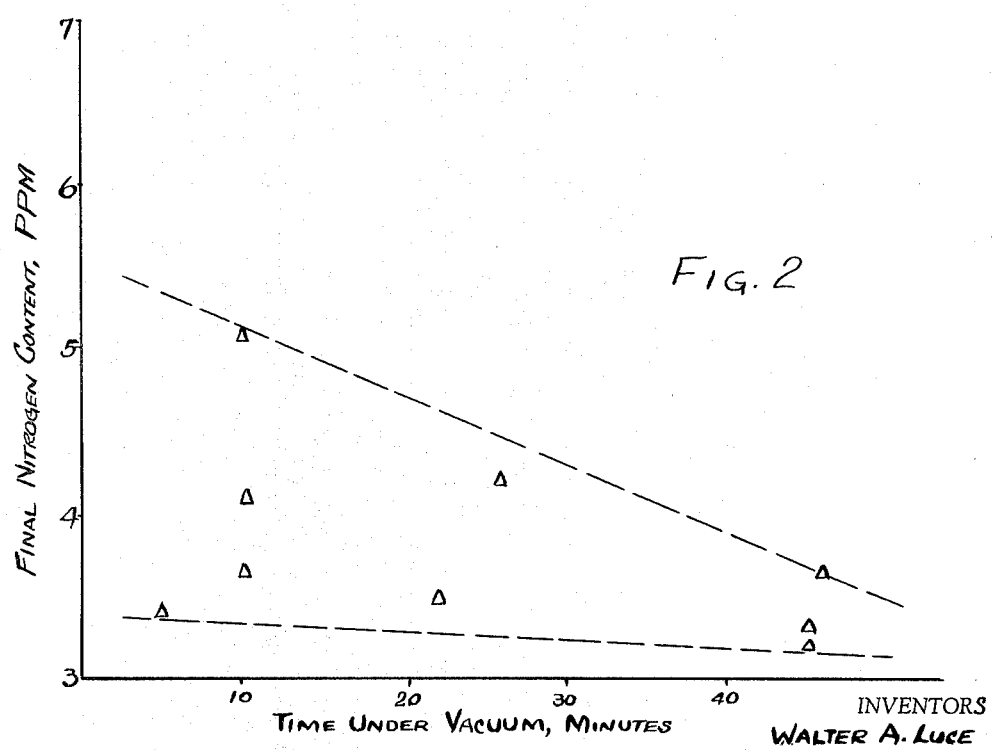
Figure 3:
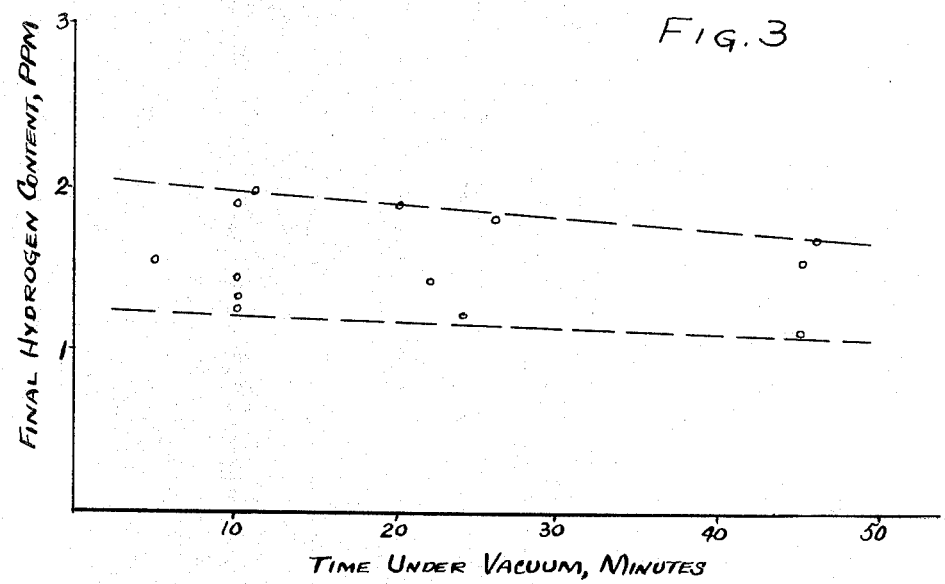

The effect of time of vacuum treatment of the molten metal is illustrated in FIGS. 2 and 3 for nitrogen and hydrogen respectively. As appears here, reduction of the hydrogen and nitrogen content to the desired levels is substantially complete within 10 minutes. Oxygen presents more of a problem, as further discussed hereinafter and longer periods, up to 20 minutes, may be desirable for this reason.

A surprising difference in the microstructure of the high silicon cast iron is obtained when subjected to vacuum furnace treatment. FIGURE 4 illustrates the typical microstructure of ordinary air or reverberatory furnace produced high silicon cast iron of the nominal composition previously referred to. The magnification here and in each of the other photomicrographs shown in FIGS. 5 through 11 is one hundred-fold. The graphite pattern here is that of large acicular flakes usually arranged in roughly a "rosette" pattern, typically large Type A graphite flakes (ASTM designation A247–47). As mentioned, typical transverse load strength ranges between 900 to 1250 pounds for this material. Also there is substantial occurrence of voids associated with gas porosity, as indicated by the large dark areas in the matrix.

FIGS. 5 to 7 are typical of the same alloy after subjection to different amounts of vacuum furnace treatment. As the graphite flakes became more refined and uniformly distributed through vacuum treatment, the strength level increases from around 1400 pounds to 2000 pounds, and a dentritic pattern of the matrix and fine acicular pattern of the graphite emerges in the structure. The graphite structure is not the only criterion, however, because excessive porosity can reduce the strength level. This is illustrated by comparison of FIGS. 5 and 7 where graphite structure is considered about equal but porosity is excessive in the latter case.

The influence of section size on size and distribution of graphite for regular high silicon cast iron (nominal composition previously referred to, corresponding to standard "Duriron") and vacuum treated metal of the same composition is shown in the photomicrographs comprising FIGS. 8, 9, 10 and 11. From a comparison of this latter group with FIGS. 4 through 7, it will be seen that the graphite does not change appreciably in regular "Duriron" by increasing section size, although there is an appreciable increase in the porosity as the section size is increased (FIGS. 8, 9). A considerable difference is noted with the vacuum treated metal between the thin section (FIG. 10) and thick section (FIG. 11). The thin section with a faster cooling rate shows a very fine graphite pattern with little porosity, while that of a thick section and slower cooling rate shows large flakes and increased porosity similar to metal from the regular reverberatory furnace.

Nodularization of high silicon iron, whether it is vacum treated or regular air furnace metal, can be obtained by addition of cerium, and the strength of the nodularized structure is high, commonly over 2,000 pounds transverse load. However, the thermal shock resistance is very poor, much worse in fact than the conventional material. A comparison is made in FIG. 12 between standard, nodularized and vacuum treated material.

Figure 13:
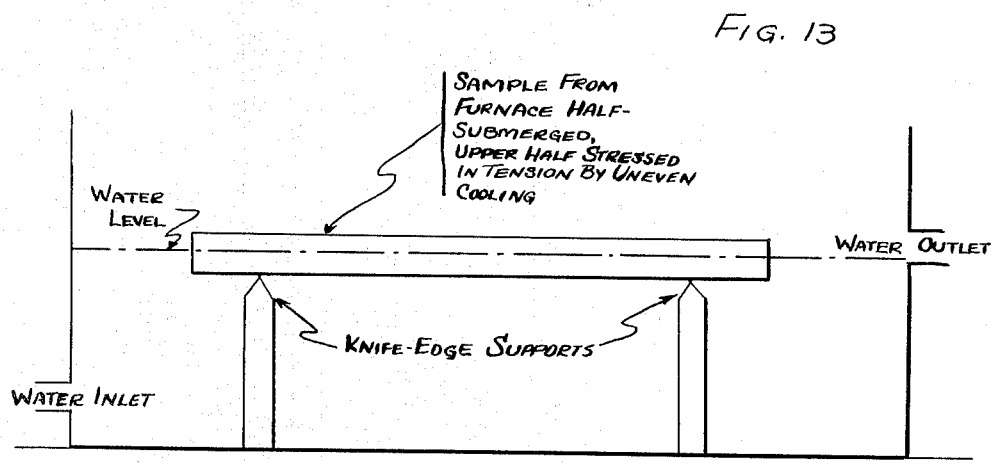

Determination of thermal shock resistance is made by heating a standard transverse load test bar to elevated temperatures and immediately lowering the bar onto supports in a continuously circulating water bath at normal ambient temperatures of 65° to 70° F. The supports are placed to dispose the bar horizontally so that the water surface bisects the bar along its length, in the manner illustrated in FIG. 13. When conditions have stabilized, the bar is then checked visually for cracking and also is subjected to the standard transverse load test previously described.

Thermal shock resistance is a very important characteristic in these high silicon cast irons since equipment such as chemical pumps, for example, may be subjected to sudden and drastic temperature changes occasioned by the passage of hot fluids through a pump which has been standing and has become stabilized at ambient room temperature.

The results of a number of different heats when subjected to the thermal shock test mentioned above are shown in FIG. 12. It will be noted that for thermal shock temperatures up to around 400° F, the transverse strength remains fairly constant for all three types of alloys tested. However, when thermally shocked from 600° F, standard reverberatory furnace high silicon cast iron drops to about 50% of its initial transverse load strength. Nodularized (cerium treated) high silicon iron drops even more drastically, to around 25% of its initial load strength, and at this point is thus worse than the conventional alloy. The vacuum degassed alloy thermally shocked from 600° F. also suffers some loss, but still retains better than 80% of its initial strength and accordingly represents a very substantial improvement over each of the other two types.

The cerium nodularized material furthermore requires special care in handling in the foundry, and particularly where it is necessary to remove flashing or other excess metal from a casting by grinding. This operation produces high localized heat zones, with resultant spalling in the case of alloys, such as the cerium nodularized material, prone to heat shock. Properly vacuum furnace treated high silicon cast iron, however, shows no tendency to spall under all normal grinding operations.

Resistance to mechanical shock, apart from thermal shock, is likewise important. This capability is evaluated by using the aforesaid standard test bar in a drop test which comprises repeatedly dropping a 2½ pound tup on a 2" overhanging section of the bar, starting at 4" above the bar and increasing the drop height by 1" increments until fracture occurs. The final height of the drop is then used to give a relative indication of resistance to mechanical shock. Comparison of values obtained for different heats is given in Table I, from which it is apparent that the optimum alloy (e.g. Heat No. E-10054) is substantially better than any of the other heats.

The desired high level of corrosion resistance in the basic or nominal high silicon cast iron composition is not adversely affected by the vacuum treatment here disclosed. Corrosion tests on samples of the conventional composition and the same metal subjected to vacuum show a definite trend toward better corrosion resistance in the latter. This is particularly true where obtaining a passivated surface condition is quite difficult as in hydrochloric and dilute sulfuric acids and is apparently due to the more homogenous nature of the vacuum treated metal.

Production of the improved high silicon cast irons is most conveniently accomplished by transferring an air furnace melt, while still molten, to a vacuum furnace. It is also possible to charge the vacuum furnace initially with scrap castings or charges made from virgin materials (pig iron, ingot iron and ferro-silicon). The vacuum applied may vary from as low as 1 mm. Hg to as high as 50 mm. Furnace temperature will of course have an effect here, as well as the time the charge is subject to the reduced pressure. Hydrogen and nitrogen are readily removed when an adequate "boil" is achieved. The results are substantially equal at temperatures between 2600° and 2800° F. and only when treatment is carried out below 2600° F. does substantial variation begin to appear. An operating temperature of 2625° F. appears optimum. No great difference appears between pressures below 2 mm. and those at 4–6 mm. and consequently the preferred practice is to employ a pressure of about 5 mm. maximum. As previously mentioned, the time under vacuum has an effect as shown in FIGS. 1 and 2. Relatively short times are required for hydrogen (5 to 10 minutes are generally adequate at 5 mm.). More consistent nitrogen values are obtained at somewhat longer times but nitrogen values above 6 p.p.m. can occasionally be tolerated, providing the hydrogen content is adequately low. The influence of vacuum on oxygen content is much more complex since a good "boil" is needed before the oxygen level is appreciably lowered. The level of 20 p.pm. for oxygen previously mentioned represents an apparent equilibrium point and attainment of levels below this are extremely difficult.

Carbon content within the usual range for the high silicon cast iron alloy, as from 0.9% to 1.1%, has little influence on the final gas values or strength. Generally the same holds for the wider carbon range, say 0.3 to 1.5%.

Modifications of the nominal high silicon cast iron composition defined hereinabove also respond favorably to the degassing treatment just described. Thus, alloys of this type containing molybdenum in amounts up to 2% or 3%, and/or chromium of from 3% to 6%, may have their transverse load strength and thermal shock resistance substantially improved in this manner.

What is claimed is:

1. The method of improving the mechanical properties of high silicon cast iron containing at least about 12% silicon, 1% carbon, the balance substantially all iron to obtain a minimum transverse load strength of 1600 pounds in the as-cast metal, which comprises the steps of subjecting the molten cast iron to vacuum to reduce the gas content thereof to not over about 2 p.p.m. of hydrogen, 6 p.p.m. of nitrogen and 20±10 p.p.m. of oxygen, and immediately casting the metal.

2. The method as defined in claim 1, wherein the molten metal is subjected to a maximum pressure of not over 5 mm. in a vacuum furnace for a period of 10 to 20 minutes at a temperature of not less than 2600° F.

3. The method as defined in claim 1, wherein the silicon content of the cast iron is approximately 14% to 15%.

4. The method as defined in claim 3, wherein said cast iron further includes molybdenum up to 2%.

5. The method as defined in claim 4, wherein said cast iron also includes 3% to 6% chromium.

6. The method as defined in claim 3, wherein said cast iron also includes 3% to 6% chromium.

7. High silicon cast iron having a silicon content of at least 12%, carbon of about 1%, the balance being substantially all iron; said alloy as cast having not over about 2 p.p.m. of hydrogen, 6 p.p.m. of nitrogen, 20±10 p.p.m. of oxygen; said alloy further having a minimum transverse load strength of at least 1600 pounds and characterized by a microstructure of fine acicular graphite uniformly distributed in a fine grain dendritic iron silicide matrix.

8. High silicon cast iron as defined in claim 7, wherein the silicon content is approximately 14% to 15%.

9. High silicon cast iron as defined in claim 8, which further includes molybdenum up to 2%.

10. High silicon cast iron as defined in claim 9, which also includes 3% to 6% chromium.

11. High silicon cast iron as defined in claim 8, which also includes 3% to 6% chromium.

References Cited by the Examiner

UNITED STATES PATENTS

| | | | |
|---|---|---|---|
| 1,277,523 | 9/1918 | Yensen | 75—49 |
| 1,972,103 | 9/1934 | Parsons | 148—110 |
| 2,144,200 | 1/1939 | Rohn | 75—49 |
| 2,173,312 | 9/1939 | Rohn | 75—123 |
| 2,994,602 | 8/1961 | Matsuda | 75—49 |
| 3,026,195 | 3/1962 | Edstrom | 75—49 |
| 3,042,512 | 7/1962 | Moore | 75—123 |
| 3,055,755 | 9/1962 | Schelleng | 75—123 |
| 3,137,566 | 6/1964 | Thieme | 75—49 |

FOREIGN PATENTS 338,409   11/1930   Great Britain.

OTHER REFERENCES

Alloys of Iron and Silicon, E. S. Greiner et al., McGraw-Hill, New York, 1933, pp. 189–190 and 299, TA 479. S567.

DAVID L. RECK, *Primary Examiner.*

WINSTON A. DOUGLAS, *Examiner.*